US012678990B2

(12) United States Patent　　　　(10) Patent No.: US 12,678,990 B2
Kole et al.　　　　　　　　　　　　　(45) Date of Patent: Jul. 14, 2026

(54) TOOLING FOR PRODUCING Z-CHANNELS IN CERAMIC FIBER PREFORMS

(71) Applicant: Raytheon Technologies Corporation, Farmington, CT (US)

(72) Inventors: Molly Kole, Hartford, CT (US); Olivier H. Sudre, Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 482 days.

(21) Appl. No.: 18/123,046

(22) Filed: Mar. 17, 2023

(65) Prior Publication Data

US 2024/0308922 A1　　　Sep. 19, 2024

(51) Int. Cl.
　　 *B26F 1/24*　　　(2006.01)
　　 *C04B 35/628*　　(2006.01)
　　 *C04B 35/634*　　(2006.01)
　　 *C04B 35/80*　　　(2006.01)
　　 *D04H 18/02*　　　(2012.01)

(52) U.S. Cl.
　　 CPC .......... *B26F 1/24* (2013.01); *C04B 35/62834* (2013.01); *C04B 35/62884* (2013.01); *C04B 35/634* (2013.01); *C04B 35/80* (2013.01); *D04H 18/02* (2013.01); *C04B 2235/5224* (2013.01); *C04B 2235/5244* (2013.01); *C04B 2235/5256* (2013.01); *C04B 2235/5276* (2013.01); *C04B 2235/614* (2013.01)

(58) Field of Classification Search
　　 CPC .............. C04B 35/80; C04B 35/62834; C04B 35/62884; C04B 35/634; C04B 2235/5224; C04B 2235/5244; C04B 2235/5256; C04B 2235/5276; C04B 2235/614; D04H 18/02; D04H 1/00; B26F 1/24; Y10T 83/0481
See application file for complete search history.

(56) References Cited

U.S. PATENT DOCUMENTS

| | | | |
|---|---|---|---|
| 2,289,177 A | 7/1942 | Jermain | |
| 2,611,434 A | 9/1952 | Mugler | |
| 3,680,182 A * | 8/1972 | Scott ...................... | D04H 18/02 28/115 |
| 3,877,120 A * | 4/1975 | Okamoto ............... | D04H 18/02 28/115 |

(Continued)

FOREIGN PATENT DOCUMENTS

| | | |
|---|---|---|
| CN | 201483574 U | 5/2010 |
| CN | 108215246 A | 6/2018 |

(Continued)

OTHER PUBLICATIONS

Partial European Search Report for EP Application No. 24163852.7, dated Jul. 30, 2024, 12 pages.

(Continued)

*Primary Examiner* — Phong H Nguyen

(74) *Attorney, Agent, or Firm* — Kinney & Lange, P.A.

(57)　　　　　　ABSTRACT

A needle array suitable for perforating a fibrous preform includes a backplate and a plurality of needles individually removably attached to and extending away from the backplate. Each of the plurality of needles includes a bundle of ceramic filaments, a metallic sheath surrounding a first end of the bundle abutting the backplate, and a sharpened point on the second end of the bundle, the second end being oppositely disposed from the first end.

13 Claims, 5 Drawing Sheets

(56) References Cited

U.S. PATENT DOCUMENTS

| | | | |
|---|---|---|---|
| 4,486,372 A | 12/1984 | Millard et al. | |
| 4,767,095 A * | 8/1988 | Fitzgerald | E04G 13/02 |
| | | | 249/134 |
| 5,035,033 A | 7/1991 | Leuchtenmueller et al. | |
| 5,066,442 A | 11/1991 | Gutowski et al. | |
| 5,188,625 A | 2/1993 | Van et al. | |
| 5,246,520 A | 9/1993 | Scanlon et al. | |
| 5,372,494 A | 12/1994 | Vaughan | |
| 5,372,668 A | 12/1994 | Bracesco | |
| 5,515,585 A | 5/1996 | Sheehan et al. | |
| 5,560,881 A | 10/1996 | Hillman et al. | |
| 5,740,593 A | 4/1998 | Sheehan et al. | |
| 5,952,075 A | 9/1999 | Clarke et al. | |
| 6,083,436 A | 7/2000 | Thompson et al. | |
| 6,190,602 B1 | 2/2001 | Blaney et al. | |
| 6,203,738 B1 | 3/2001 | Vaders | |
| 6,233,797 B1 * | 5/2001 | Neely | D04H 18/02 |
| | | | 28/115 |
| 7,052,632 B2 | 5/2006 | Lavasserie et al. | |
| 7,200,912 B2 | 4/2007 | Bouillon et al. | |
| 7,238,247 B2 | 7/2007 | Bouillon et al. | |
| 7,997,891 B2 | 8/2011 | Gallagher et al. | |
| 8,128,775 B2 | 3/2012 | Maheshwari et al. | |
| 8,192,662 B2 | 6/2012 | Asahara et al. | |
| 8,216,641 B2 | 7/2012 | Bouchard et al. | |
| 8,448,310 B2 | 5/2013 | Vincent | |
| 9,017,761 B2 | 4/2015 | La Forest et al. | |
| 9,475,254 B2 | 10/2016 | Beraud et al. | |
| 9,546,438 B2 | 1/2017 | Fiala | |
| 10,005,246 B2 | 6/2018 | Stepanski | |
| 10,850,456 B2 | 12/2020 | Chassignet | |
| 12,318,964 B2 | 6/2025 | Pujar et al. | |
| 12,421,637 B2 | 9/2025 | Pujar et al. | |
| 2003/0121380 A1 | 7/2003 | Cowell et al. | |
| 2004/0175553 A1 | 9/2004 | Bouillon et al. | |
| 2008/0125745 A1 | 5/2008 | Basu et al. | |
| 2008/0287884 A1 | 11/2008 | Warden et al. | |
| 2010/0163167 A1 | 7/2010 | Maheshwari et al. | |
| 2010/0282886 A1 | 11/2010 | Pallmann | |
| 2011/0154629 A1 | 6/2011 | Delecroix | |
| 2015/0001834 A1 | 1/2015 | Wisniewski et al. | |
| 2016/0185092 A1 | 6/2016 | Chamberlain et al. | |
| 2016/0229755 A1 | 8/2016 | Luthra et al. | |
| 2017/0268141 A1 * | 9/2017 | Sheehan | D04H 3/105 |
| 2018/0105471 A1 | 4/2018 | Shi | |
| 2018/0147797 A1 | 5/2018 | Chassignet | |
| 2020/0130256 A1 | 4/2020 | Debora et al. | |
| 2022/0145775 A1 | 5/2022 | Dambrine et al. | |
| 2024/0109223 A1 | 4/2024 | Lenz | |
| 2024/0158970 A1 | 5/2024 | Pujar et al. | |

FOREIGN PATENT DOCUMENTS

| | | | |
|---|---|---|---|
| CN | 112077930 A | 12/2020 | |
| CN | 108127937 B | 1/2021 | |
| DE | 2343646 A1 | 3/1975 | |
| DE | 3715409 A1 | 12/1987 | |
| DE | 10356900 A1 | 7/2005 | |
| EP | 4344843 A1 | 4/2024 | |
| EP | 4375038 A1 | 5/2024 | |
| GB | 2025302 A | 1/1980 | |
| GB | 2606342 A | 11/2022 | |
| KR | 101394955 B1 | 5/2014 | |
| WO | 9731772 A1 | 9/1997 | |
| WO | 2014150393 A2 | 9/2014 | |
| WO | 2020178500 A1 | 9/2020 | |

OTHER PUBLICATIONS

S.L. Clark, "Release Agents", from Lubin, G. (eds) Handbook of Composites, Springer, Boston, MA (1982), pp. 633-638.

Extended European Search Report for EP Application No. 24163907. 9, dated Aug. 16, 2024, 5 pages.

Extended European Search Report for EP Application No. 24163852. 7, dated Dec. 2, 2024, 17 pages.

Communication Pursuant to Article 94(3) EPC for EP Application No. 24163852.7, dated Feb. 16, 2026, 11 pages.

* cited by examiner

14

16

16

16

14

W1

18

16

16

16

16

16

16

16

TOOLING FOR PRODUCING Z-CHANNELS IN CERAMIC FIBER PREFORMS

BACKGROUND

The present invention relates to the fabrication of ceramic matrix composites (CMCs) and, more particularly, to CMCs having improved properties for operating in gas turbine engines.

In the processing of CMCs, there is a need to infiltrate matrix within and around fibrous tows to replace pore volume with dense matrix material. In a woven system, large voids often exist between adjacent tows of a preform. Such voids can become large defects after infiltration of the composite that are detrimental to composite properties. The pore network through a woven system is often highly tortuous for infiltrating reactant vapors, which leads to uneven deposition through the thickness of the preform.

The formation of z-channels can create more direct pathways for reactant gases. However, the metallic needles commonly used to form z-channels can contaminate and/or deform the preform. For example, metallic particles from the needles can remain in the preform after needle removal. Such particles and the preform ceramic material(s) can have dissimilar thermal and mechanical properties, thus their presence in the final CMC can be detrimental. Improved means for perforating preforms are therefore desirable.

SUMMARY

A needle array suitable for perforating a fibrous preform includes a backplate and a plurality of needles individually removably attached to and extending away from the backplate. Each of the plurality of needles includes a bundle of ceramic filaments, a metallic sheath surrounding a first end of the bundle abutting the backplate, and a sharpened point on the second end of the bundle, the second end being oppositely disposed from the first end.

A method of forming a needle array suitable for perforating a fibrous preform includes arranging a plurality of ceramic filaments in a length-wise manner to form a bundle, coating the bundle with a reinforcing material, wrapping a sheath around the bundle such that the bundle has a sheathed portion at a first end and an exposed portion at a second end, securing the sheath to the bundle using an adhesive material, and forming a needle tip on the second end of the bundle.

A method of forming a needle suitable for perforating a fibrous preform includes arranging a plurality of ceramic filaments in a length-wise manner to form a bundle, coating the bundle with a reinforcing material, wrapping a sheath around the bundle such that the bundle has a sheathed portion at a first end and an exposed portion at a second end, securing the sheath to the bundle using an adhesive material, and forming a needle tip on the second end of the bundle.

Figure 1:
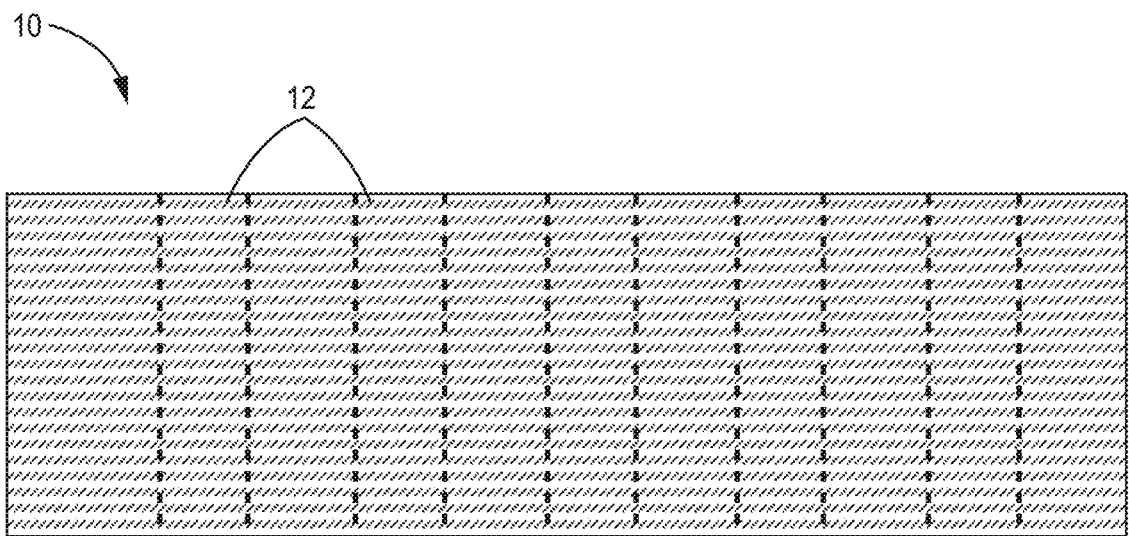
FIG. 1 is a simplified cross-sectional view of a fibrous ceramic preform.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

FIG. 1 is a simplified cross-sectional view of preform 10, which can be formed from ceramic (e.g., silicon carbide—SiC) tows arranged in one of various two or three-dimensional woven architectures such as plain, harness (e.g., 3, 5, 8, etc.), twill, braid, tape layup, or non-symmetric to name a few non-limiting examples. Non-woven architectures (e.g., chopped, felted, etc.) are also contemplated herein. A CMC formed from preform 10 can be incorporated into a gas turbine engine. To facilitate more even matrix infiltration during chemical vapor infiltration (CVI), it can be desirable to form z-channels extending through the thickness of preform 10. Z-channels provide a much less tortuous pathway along which reactant CVI gases can traversed preform 10. A desirable pattern for z-channels 12 is represented in dashed lines in FIG. 1. Z-channels 12 can be formed using needles, which are traditionally formed from a metallic material strong enough to penetrate the ceramic perform (e.g., preform 10). The use of such needles often results in metallic contaminants left in the preform. Accordingly, this disclosure presents the making and use of ceramic needles for z-channel formation.

Figure 2:
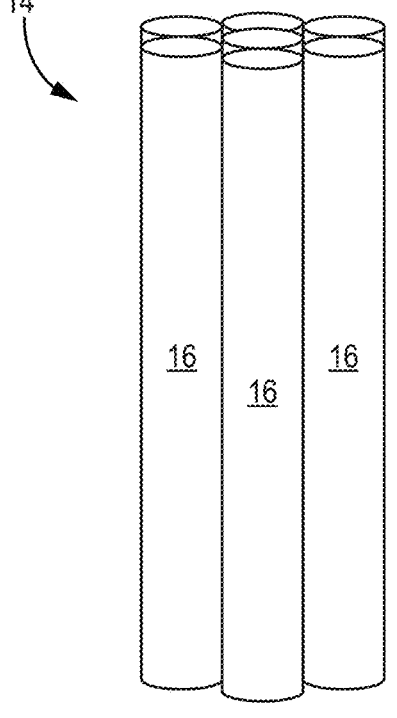
FIG. 2 is a simplified perspective view of a bundle of ceramic filaments.

FIG. 2 is a simplified perspective view of bundle 14 of ceramic filaments 16. Filaments 16 can be relatively large-diameter filaments, for example, with filament diameters of at least 25 microns, and in an exemplary embodiment, between 25 microns and 250 microns. Suitable filament types include SCS-6 monofilaments. Alternatively, bundle 14 can be formed from a subset of fibers from a subdivided (e.g., 500-fiber) ceramic tow. Each filament (or fiber) 16 can be formed from a ceramic material, such as silicon carbide (SiC), silicon nitride ($Si_3N_4$), or aluminum oxide ($Al_2O_3$). Each filament 16 can further include an interface coating (IFC) of one or a combination of boron nitride (BN), SiC, $Si_3N_4$, or pyrolytic carbon (PyC), to name a few non-limiting examples, to provide additional toughness to the resulting needle. The ceramic selected can be uniform across a given bundle 14 to ensure homogeneity of its mechanical properties. Filaments 16 can be arranged in a length-wise manner and secured as bundle 14 by, for example, coating bundle 14.

Figure 3:
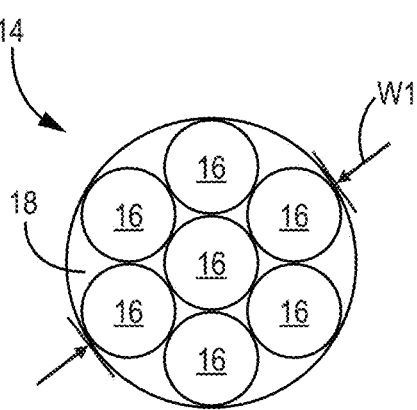
FIG. 3 is a simplified plan view of the top of the bundle of FIG. 2.

FIG. 3 is a simplified plan view of the top of bundle 14, with filaments 16 encased in reinforcing coating 18. Coating 18 can be a polymer coating, such as an epoxy resin. Alternatively, coating 18 can be a ceramic material deposited using chemical vapor deposition (CVD) or infiltration (CVI), a polymer-derived ceramic material formed by pyrolyzing a preceramic polymer, or a silicon alloy melt. As shown in FIG. 3, bundle 14 further has a width (or diameter) W1.

Figure 4:
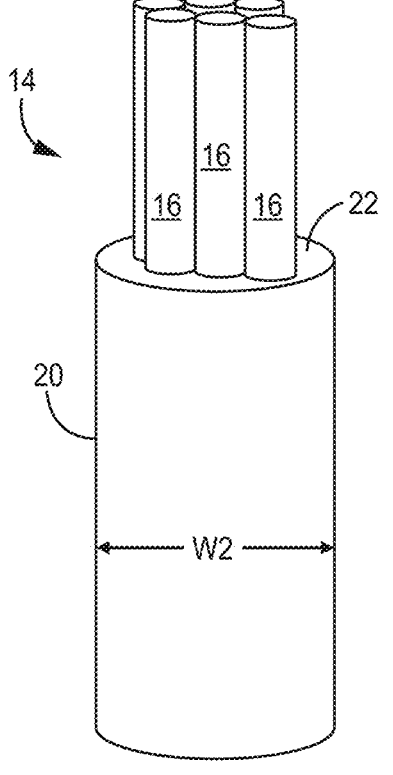
FIG. 4 is a simplified perspective view of a metallic sheath wrapped around the bundle of FIG. 2.
Figure 5:
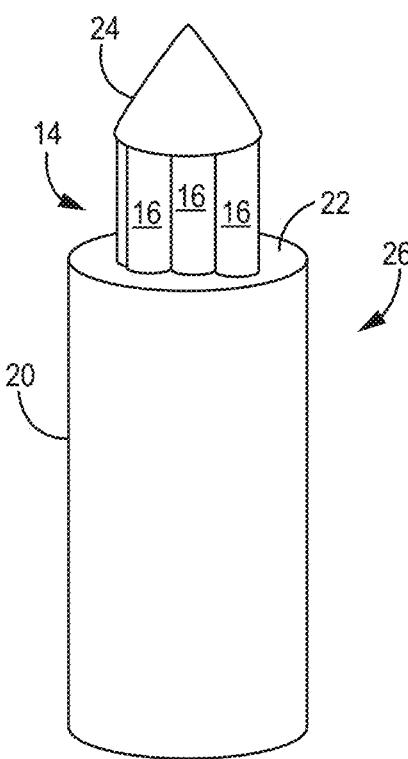
FIG. 5 is a simplified view of a needle formed after sharpening the end of the sheath-wrapped bundle of FIG. 4.

After individual filaments 16 are secured together, bundle 14 can be further reinforced. FIG. 4 is a simplified perspective view of metallic sheath 20 wrapped around a portion/one end of bundle 14. Adhesive material 22 (e.g., glue, cement, or solder) can secure metallic sheath 20 around bundle 14. Metallic sheath 20 has a width (or diameter) W2 which can be greater than width W1 of bundle 14. FIG. 5 is a simplified perspective view showing bundle 14 after its exposed (i.e., unsheathed) end/tip has been sharpened to a point (i.e., point 24). Point 24 can be formed using, for example, a grinding wheel or a jig. Rotation of point 24 evenly relative to the grinding wheel or jig can form the generally conical point 24 shown in FIG. 5. In an alternative embodiment, a point having an off-axis orientation can be formed by preferentially sharpening one portion of point 24. Because it is formed from the underlying ceramic filaments 16, point 24 is also ceramic. With point 24 formed, the entire arrangement of bundle 14 with metallic sheath 20 becomes needle 26. In some embodiments, needle 26 can undergo CVI for additional SiC coating(s).

Figure 6:
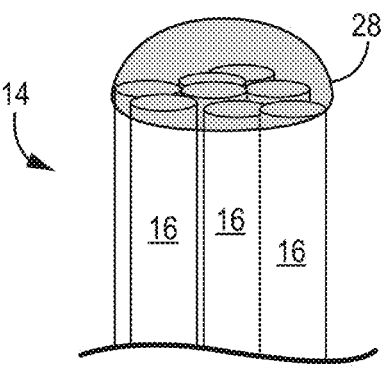
FIG. 6 is a simplified perspective view of a portion of the bundle with an alternative tip.

FIG. 6 is a perspective view of just the exposed portion of bundle 14. Instead of forming point 24, a bead can be placed on the end of bundle 14 to form beaded tip 28. Beaded tip 28 has a rounded shape, and can be used, for example, with certain types of fabric (e.g., loosely woven, low PPI/EPI, etc.) to non-destructively push tows away as it moves through preform 10. Beaded tip 28 can be formed from a SiC precursor or polymer material, to name a few non-limiting examples.

Figure 7:
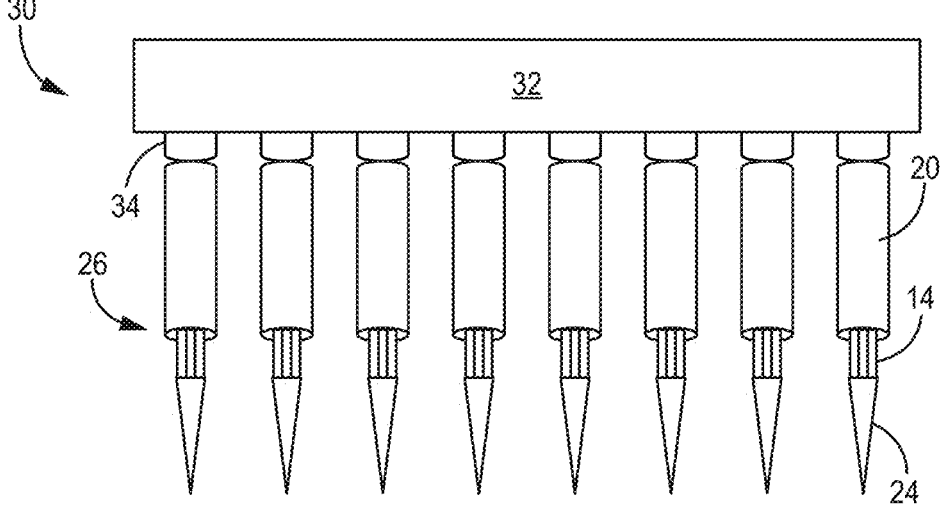
FIG. 7 is a simplified side view of an array of needles.

FIG. 7 is a simplified side view of needle array 30 with multiple needles 26 extending from backplate 32. As shown, each needle 26 includes metallic sheath 20 surrounding a bundle 14 of filaments/fibers, and conical point 24. Each needle 26 can be removably connected to backplate 32 via threaded or other engagement with mounts 34. Needles 26 can be arranged in columns and rows, or other pattern, and may correspond to infiltration holes of a tooling fixture (not shown) in order to be used with tooling-mounted fixtures. As such, the maximum width of a particular needle (i.e., W2) should be smaller than the diameter of an infiltration hole.

Needles 26 are individually removable to such that damaged needles 26 can be easily replaced, or the particular arrangement of needles 26 altered as desired. Generally speaking, only the ceramic, unsheathed portion (i.e., portion not covered by metallic sheath 20) of needle 26 will be inserted into a preform (i.e., preform 10) for z-channel formation. Thus, any contaminants (i.e., ceramic particles from needles 26) remaining in preform 10 after z-channel formation can become part of the final CMC component with little detrimental impact on component properties. Needles 26 formed from ceramic may also be more durable than metallic needles, with a longer useful life.

A CMC component formed with the disclosed perforating means can be incorporated into aerospace, maritime, or industrial equipment, to name a few, non-limiting examples.

Discussion of Possible Embodiments

The following are non-exclusive descriptions of possible embodiments of the present invention.

A needle array suitable for perforating a fibrous preform includes a backplate and a plurality of needles individually removably attached to and extending away from the backplate. Each of the plurality of needles includes a bundle of ceramic filaments, a metallic sheath surrounding a first end of the bundle abutting the backplate, and a sharpened point on the second end of the bundle, the second end being oppositely disposed from the first end.

The needle array of the preceding paragraph can optionally include, additionally and/or alternatively, any one or more of the following features, configurations and/or additional components:

In the above needle array, each of the ceramic filaments can be formed from one of silicon carbide, silicon nitride, and aluminum oxide.

In any of the above needle arrays, each of the ceramic filaments can further include an interface coating of at least one of boron nitride, silicon carbide, silicon nitride, and pyrolytic carbon.

In any of the above needle arrays, the bundle of ceramic filaments can further include a reinforcing coating including one of epoxy, a ceramic, a polymer-derived ceramic, and a silicon alloy.

In any of the above needle arrays, the metallic sheath can be secured to the bundle of ceramic filaments with an adhesive material.

In any of the above needle arrays, a width of the metallic sheath can be greater than a width of the bundle of ceramic filaments.

A method of forming a needle array suitable for perforating a fibrous preform includes arranging a plurality of ceramic filaments in a length-wise manner to form a bundle, coating the bundle with a reinforcing material, wrapping a sheath around the bundle such that the bundle has a sheathed portion at a first end and an exposed portion at a second end, securing the sheath to the bundle using an adhesive material, and forming a needle tip on the second end of the bundle.

The method of the preceding paragraph can optionally include, additionally and/or alternatively, any one or more of the following features, configurations and/or additional components:

In the above method, forming the needle tip can include placing a rounded bead on the second end.

In any of the above methods, the rounded bead can be formed from one of a silicon carbide precursor and a polymer material.

In any of the above methods, forming the needle tip can include sharpening the second end to form a point.

In any of the above methods, the second end can be sharpened using one of a grinding wheel and a jig.

Any of the above methods can further include attaching each of the plurality of needles to a backplate.

A method of forming a needle suitable for perforating a fibrous preform includes arranging a plurality of ceramic filaments in a length-wise manner to form a bundle, coating the bundle with a reinforcing material, wrapping a sheath around the bundle such that the bundle has a sheathed portion at a first end and an exposed portion at a second end, securing the sheath to the bundle using an adhesive material, and forming a needle tip on the second end of the bundle.

The method of the preceding paragraph can optionally include, additionally and/or alternatively, any one or more of the following features, configurations and/or additional components:

In the above method, forming the needle tip can include placing a rounded bead on the second end.

In any of the above methods, the rounded bead can be formed from one of a silicon carbide precursor and a polymer material.

In any of the above methods, forming the needle tip can include sharpening the second end to form a point.

In any of the above methods, the second end can be sharpened using one of a grinding wheel and a jig.

Any of the above methods can further include attaching the needle to a backplate.

In any of the above methods, the reinforcing coating can include one of epoxy, a ceramic, a polymer-derived ceramic, and a silicon alloy.

Any of the above methods can further include after forming the needle, applying silicon carbide to the needle using chemical vapor infiltration.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A needle array suitable for perforating a fibrous preform, the needle array comprising:
   a backplate; and
   a plurality of needles individually removably attached to and extending away from the backplate, each of the plurality of needles comprising:
      a plurality of ceramic filaments secured together as a bundle forming a body of each respective needle;
      a metallic sheath surrounding a first end of the bundle abutting the backplate; and
      a single shaped tip on a second end of the bundle, the second end being oppositely disposed from the first end;
   wherein the single shaped tip is a sharpened point or a rounded point.

2. The needle array of claim 1, wherein each of the ceramic filaments is formed from one of silicon carbide, silicon nitride, and aluminum oxide.

3. The needle array of claim 2, wherein each of the ceramic filaments further comprises an interface coating of at least one of boron nitride, silicon carbide, silicon nitride, and pyrolytic carbon.

4. The needle array of claim 2, wherein the bundle of ceramic filaments is further encased in a reinforcing coating comprising of one of epoxy, a ceramic, a polymer-derived ceramic, and a silicon alloy.

5. The needle array of claim 1, wherein the metallic sheath is secured to the bundle of ceramic filaments with an adhesive material.

6. The needle array of claim 1, wherein a width of the metallic sheath is greater than a width of the bundle of ceramic filaments.

7. The needle array of claim 1, wherein the shaped tip comprises one of silicon carbide precursor and a polymer material.

8. A method of forming a needle suitable for perforating a fibrous preform, the method comprising:

arranging a plurality of ceramic filaments in a length-wise manner and securing the plurality of ceramic filaments together as a bundle forming a body of each respective needle;

coating the bundle with a reinforcing material;

wrapping a metallic sheath around the bundle such that the bundle has a sheathed portion at a first end and an exposed portion at a second end;

securing the metallic sheath to the bundle using an adhesive material; and forming a single shaped needle tip on the second end of the bundle;

wherein each of a plurality of the needles is configured to be removably attached to a backplate to form a needle array in which the plurality of needles extends away from the backplate;

wherein forming the single needle tip comprises placing a rounded bead on the second end; or wherein forming the single needle tip comprises sharpening the second end to form a point.

9. The method of claim 8, wherein the rounded bead is formed from one of a silicon carbide precursor and a polymer material.

10. The method of claim 8, wherein the second end is sharpened using one of a grinding wheel and a jig.

11. The method of claim 8, wherein the reinforcing coating comprises one of epoxy, a ceramic, a polymer-derived ceramic, and a silicon alloy.

12. The method of claim 8 and further comprising: after forming the needle, applying silicon carbide to the needle using chemical vapor infiltration.

13. A method of forming a needle array suitable for perforating a fibrous preform, the method comprising:
   forming a plurality of needles, wherein forming each of the plurality of needles comprises:
      arranging a plurality of ceramic filaments in a lengthwise manner and securing the plurality of ceramic filaments together as a bundle forming a body of each respective needle;
      coating the bundle with a reinforcing material;
      wrapping a metallic sheath around the bundle such that the bundle has a sheathed portion at a first end and an exposed portion at a second end;
      securing the metallic sheath to the bundle using an adhesive material;
      forming a single shaped needle tip on the second end of the bundle; and
      attaching each of the plurality of needles to a backplate such that the plurality of needles extends away from the backplate;
   wherein forming the single needle tip comprises placing a rounded bead on the second end, wherein the rounded bead is formed from one of a silicon carbide precursor and a polymer material; or
   wherein forming the single needle tip comprises sharpening the second end using one of a grinding wheel and a jig to form a point.

* * * * *